US012753859B2

(12) United States Patent
Johnson, Jr.

(10) Patent No.: US 12,753,859 B2
(45) Date of Patent: Oct. 6, 2026

(54) DEVICE FOR ENABLING A HOSE TO SLIDE RELATIVE TO A TIRE

(71) Applicant: Richard Alan Johnson, Jr., Shallotte, NC (US)

(72) Inventor: Richard Alan Johnson, Jr., Shallotte, NC (US)

( * ) Notice: Subject to any disclaimer, the term of this patent is extended or adjusted under 35 U.S.C. 154(b) by 13 days.

(21) Appl. No.: 18/889,873

(22) Filed: Sep. 19, 2024

(65) Prior Publication Data

US 2025/0102078 A1 Mar. 27, 2025

Related U.S. Application Data

(60) Provisional application No. 63/585,649, filed on Sep. 27, 2023.

(51) Int. Cl.
*F16L 3/01* (2006.01)

(52) U.S. Cl.
CPC .................................... *F16L 3/01* (2013.01)

(58) Field of Classification Search
CPC .................................... F16L 3/00; F16L 3/01
See application file for complete search history.

(56) References Cited

U.S. PATENT DOCUMENTS 3,754,305 A * 8/1973 Kline ...................... B05B 15/00 248/75
3,800,917 A * 4/1974 Vick ........................ B60T 3/00 188/32
4,778,135 A * 10/1988 Legard ...................... B60T 3/00 248/352
4,836,432 A * 6/1989 Violette .................. B05B 15/00 242/615
4,884,664 A * 12/1989 Berg ......................... B60T 3/00 D12/217
4,895,225 A * 1/1990 Parnell ...................... B60T 3/00 242/615.4
5,427,209 A * 6/1995 Tannehill .................. B60S 3/00 188/32
5,427,339 A * 6/1995 Pauli .................... B65H 75/366 242/615
D432,902 S * 10/2000 Thiel ............................... D8/354
6,598,826 B1 * 7/2003 Therriault ................. B60S 5/04 242/615
6,622,960 B2 * 9/2003 Hyde ..................... B65H 57/00 242/615
D492,928 S * 7/2004 Pond ............................ D12/217
7,040,461 B2 * 5/2006 Chrisco ..................... B60T 3/00 D12/217
D639,147 S * 6/2011 Surles ............................ D8/356
D644,159 S * 8/2011 Marcum ...................... D12/217
9,624,067 B1 * 4/2017 Tomney ................. B65H 57/02
D801,152 S * 10/2017 Bishop ......................... D12/217
D821,855 S * 7/2018 Liao ............................. D12/217

(Continued)

*Primary Examiner* — Monica E Millner
(74) *Attorney, Agent, or Firm* — Dilworth & Barrese, LLP

(57) ABSTRACT

A device for enabling a hose to slide relative to a tire, preventing it from becoming trapped. The device includes a base with a semi-circular recess that fits snugly against a tire, and a body with a concave tire abutment surface. A channel is defined within the body, allowing a hose to slide laterally with minimal friction. This device is particularly useful for automotive technicians and individuals with mobility issues, ensuring smooth hose movement during activities such as car washing or tire inflation.

9 Claims, 6 Drawing Sheets

(56) References Cited

U.S. PATENT DOCUMENTS

| | | | | |
|---|---|---|---|---|
| D842,209 | S * | 3/2019 | Chiang | D12/213 |
| 2013/0193262 | A1* | 8/2013 | Torres | B65H 57/04 242/615 |

* cited by examiner

SECTION A-A

DEVICE FOR ENABLING A HOSE TO SLIDE RELATIVE TO A TIRE

CROSS-REFERENCE TO RELATED APPLICATIONS

This application claims the benefit of U.S. Provisional Patent Application having the Ser. No. of 63/585,649, entitled DEVICE FOR ENABLING A HOSE TO SLIDE RELATIVE TO A TIRE, which was invented by Richard Alan Johnson, Jr. of Shallotte, NC, and filed on Sep. 27, 2023. The provisional application in incorporated by reference in its entirety into this non-provisional application.

BACKGROUND OF THE INVENTION

The present invention relates to vehicle accessories, and more specifically, to devices for enabling a hose to slide relative to a tire.

Anyone who has used a hose near a tire, for example in washing a car or inflating a tire, has experienced a hose becoming wedged in the crevice between the tire and the ground or floor. One may try to prevent the problem by maintaining a lot of slack in the hose and mindfully repositioning the hose in order to prevent the hose from contacting the crevice, or one may dislodge the inevitably stuck hose through a combination of repositioning, pulling, and/or whipping the hose. While this familiar experience may be a mere inconvenience for some, it is more problematic for people such as automotive technicians who work around tires and hoses all day, and for people with mobility issues.

As can be seen, there is a need for a device that enables a hose to slide relative to a tire in a manner that prevents the hose from getting stuck, thereby facilitating free movement of the hose, as well as the person using the hose. It is desirable that this sliding device is small, portable, easy to set up and use, economical, and effective.

SUMMARY OF THE INVENTION

The present invention relates to a device designed to facilitate the movement of hoses in proximity to vehicle tires, particularly to prevent hoses from becoming trapped under the tire. The invention addresses a common problem encountered during activities like car washing or tire inflation, where hoses often get stuck in the crevice between a tire and the ground. In a preferred embodiment a device is sized and shaped to rest on the ground/floor adjacent to a tire and nestle against the shoulder of a tire. The properly positioned device not only physically blocks the crevice in which hoses typically become lodged, but it provides a channel through which the hose can laterally slide. This invention provides a practical, portable solution that prevents a hose from getting wedged. The device is compact, easy to use, and can be manufactured from various materials, making it suitable for a wide range of applications.

DETAILED DESCRIPTION OF THE INVENTION

As used herein, the following structure numbers shall refer to the various structures of the invention as depicted in the figures:

10—Sliding device;
20—Base;
25—Recess;
30—Body;
34—Tire abutment surface;
36—Stabilizing protrusion;
38—Channel;
50—Tire;
55—Shoulder; and
60—Hose.

The following detailed description describes the best currently contemplated modes of carrying out exemplary embodiments of the invention. The description is not to be taken in a limiting sense, but is made merely for the purpose of illustrating the general principles of the invention, since the scope of the invention is best defined by the appended claim.

As used herein, "lateral" and the like shall be used interchangeably with "horizontal" and the like unless otherwise stated or contrary to common sense. These terms generally refer to the path of a moving hose, for example by pulling a hose such that the longitudinal axis of the hose travels in a generally horizontal plane, typically along the ground, garage floor, driveway, or the like.

Broadly, the present invention is a device for enabling a hose to slide relative to a tire. The device is positioned adjacent to a tire, on the surface upon which the tire is resting, for example the ground, garage floor, or driveway. The device is sized and shaped to rest snugly against the tire, and presents an outwardly facing open channel through which a hose can laterally slide relative to the tire with significantly less friction and chance of getting stuck than that which would exist with the hose in direct contact with and moving against a tire. This allows one to use a hose in the vicinity of a tire, for example a water hose for car washing or an air hose for tire inflation, without the hose getting stuck under the tire. It should be understood that the present inventions could be used with a multitude of elongated objects other than hoses, for example electrical cords. "Hose" is used herein for clarity and conciseness, but such usage should not be construed as a limitation of the device, method of using, or intended use.

Figure 1:
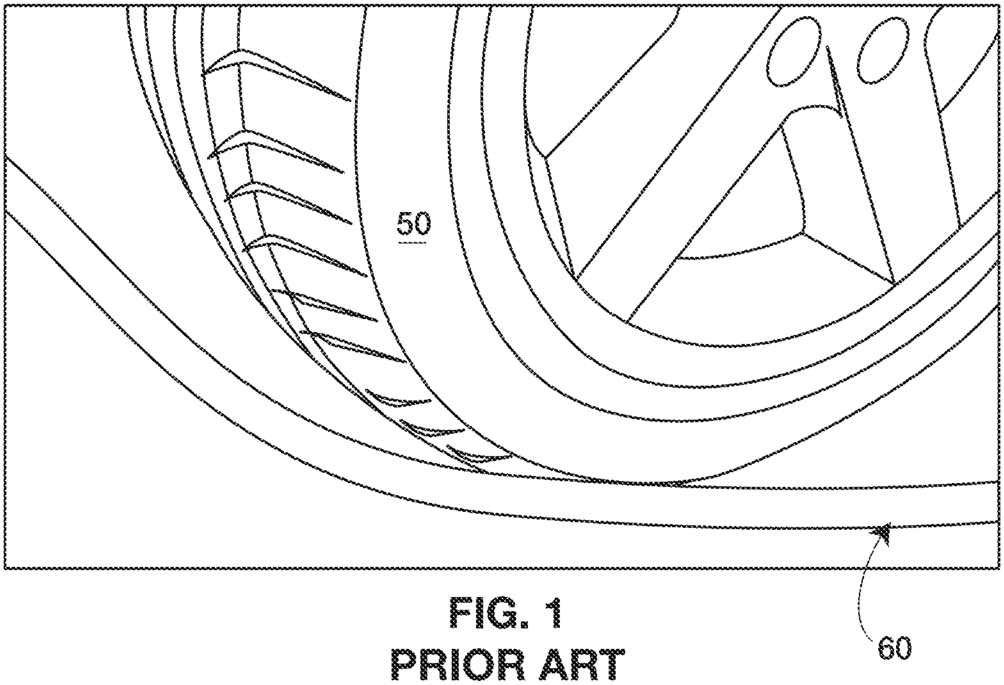
FIG. 1 PRIOR ART
FIG. 1 depicts a hose wedged under a tire not employing a device, in accordance with the prior art.

Referring to the prior art of FIG. 1, conventional hose 60 commonly becomes trapped under tire 50, thereby impeding lateral movement of the hose relative to the tire, and ultimately requiring a person to dislodge the hose to reposition it. This figure presents the general problem addressed by the current inventions.

Figure 2:
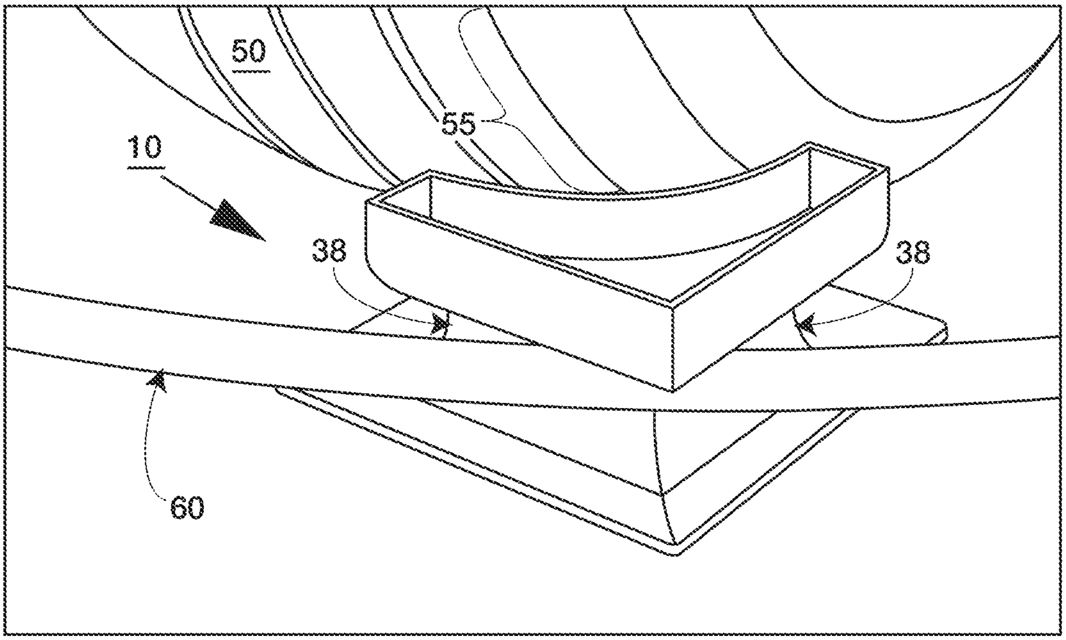
FIGS. 2-4 depict an embodiment of the present invention in use.
Figure 3:
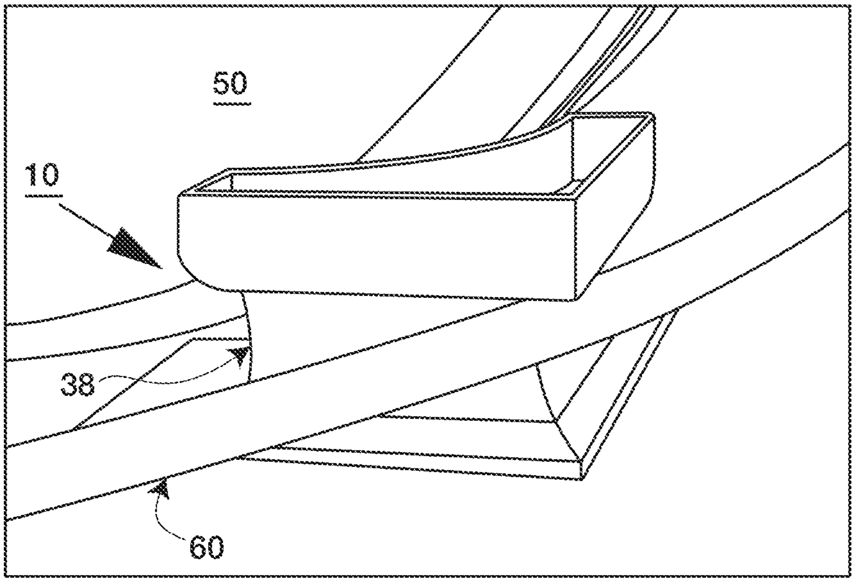
Figure 4:
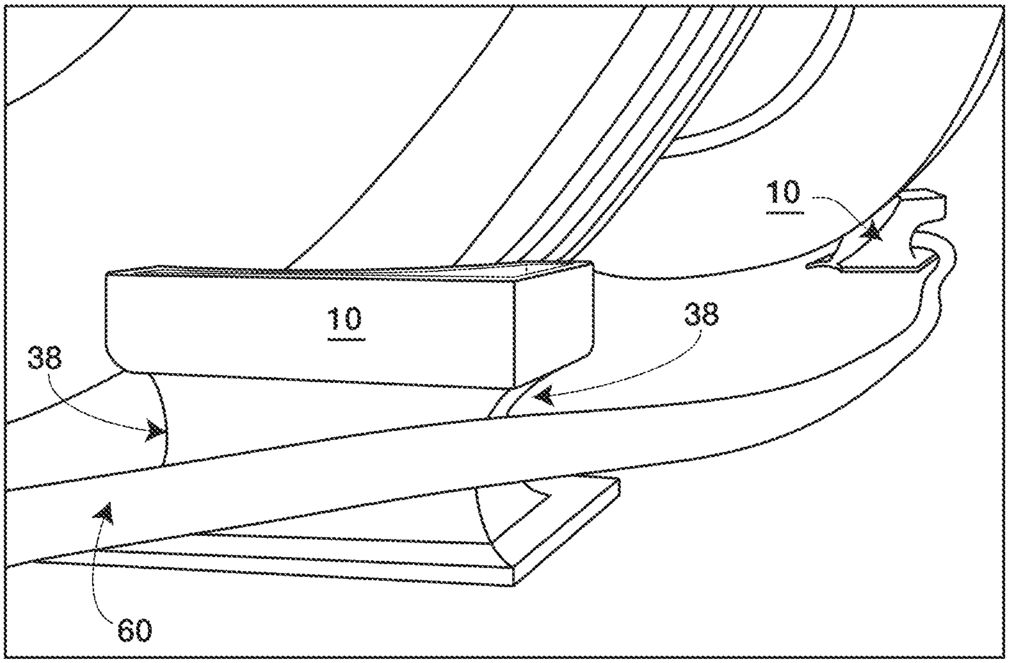

FIGS. 2-4 depict multiple views of sliding device 10 positioned adjacent to tire 50 with hose 60 traversing channel 38. Depending on the circumstances it may be desirable to employ more than one device, for example one device per tire, with FIG. 4 depicting two devices. In use, hose 60 exerts inwardly directed force on sliding device 10, thereby retaining the device in position adjacent the tire.

Figure 5:
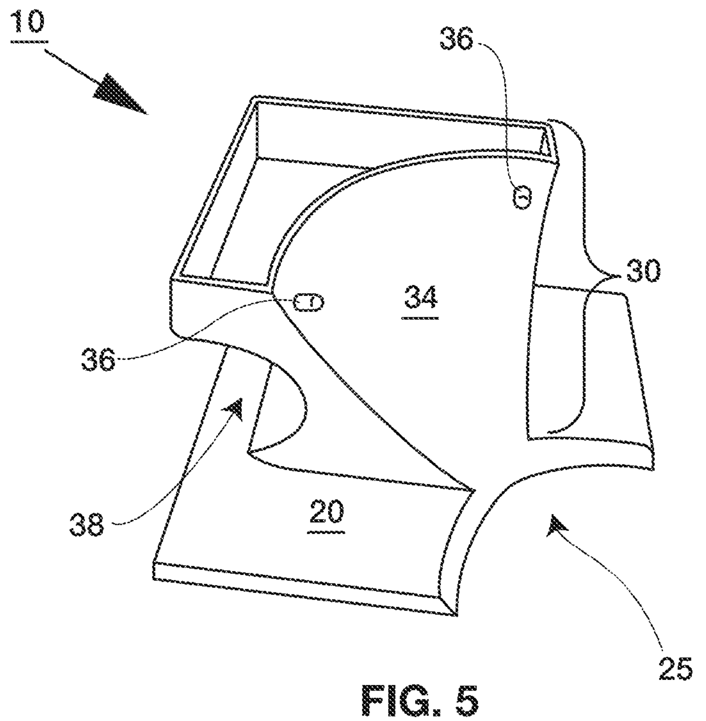
FIGS. 5-8 are perspective depictions of an embodiment.

Referring to FIG. 5, sliding device 10 generally includes base 20 and body 30. Base 20 defines recess 25 which borders and preferably is in contact with a portion of tire 50 in use. Body 30 protrudes upwardly from base 20 and defines tire abutment surface 34 which is preferably concave and preferably includes at least one stabilizing protrusion 36 to prevent slippage of device relative to the adjacent tire.

Figure 6:
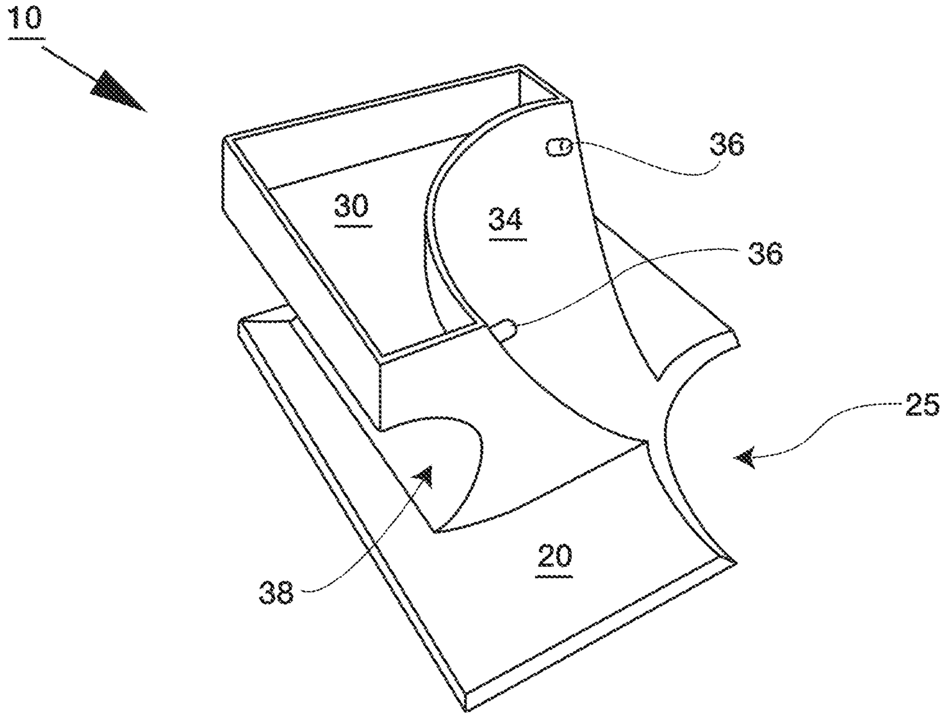
Figure 7:
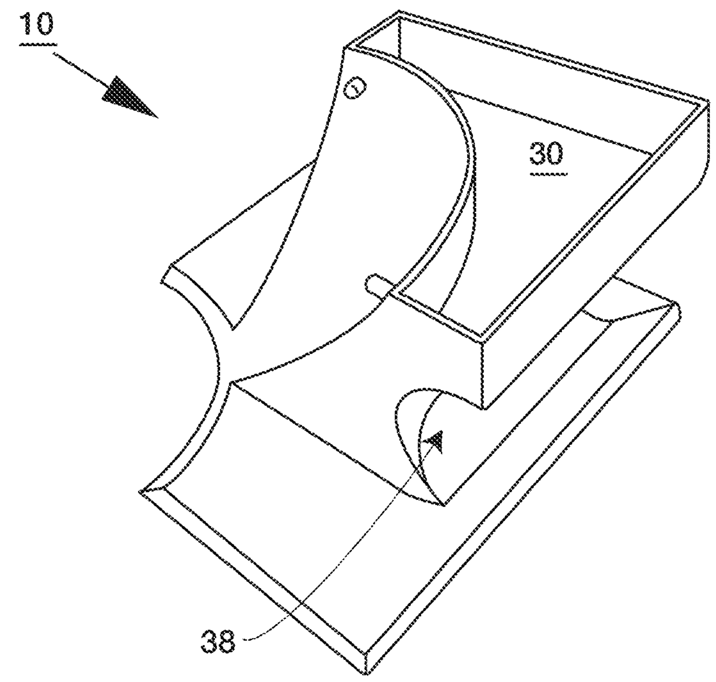
Figure 8:
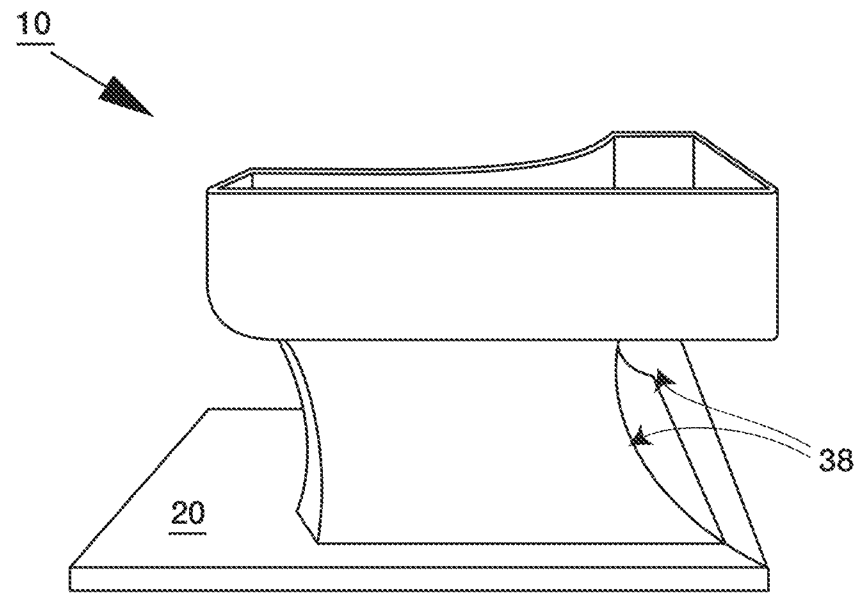

Referring to FIGS. 6-8, body 30 defines open-sided channel 38, through which a hose will slide laterally in use. In a preferred embodiment the device includes a single semi-circular open channel 38, although a plurality of channels, channels employing various shapes, and closed channels are also within the scope of the invention. Channel 38 is sized and shaped to allow free lateral sliding movement of the hose it accommodates. By way of example, a channel with an approximately 2.00" diameter would accommodate a hose having an approximately 1.25" diameter. In a preferred embodiment channel 38 is curved, having an arc of approximately 180° and a path the full length of the body, although channels having different lengths and arcs, and in particular approximately 160°-approximately 200° are also within the scope of the invention. The device is approximately 3.00"-approximately 3.50" tall, with approximately 3.25" tall being most preferred.

Figure 9:
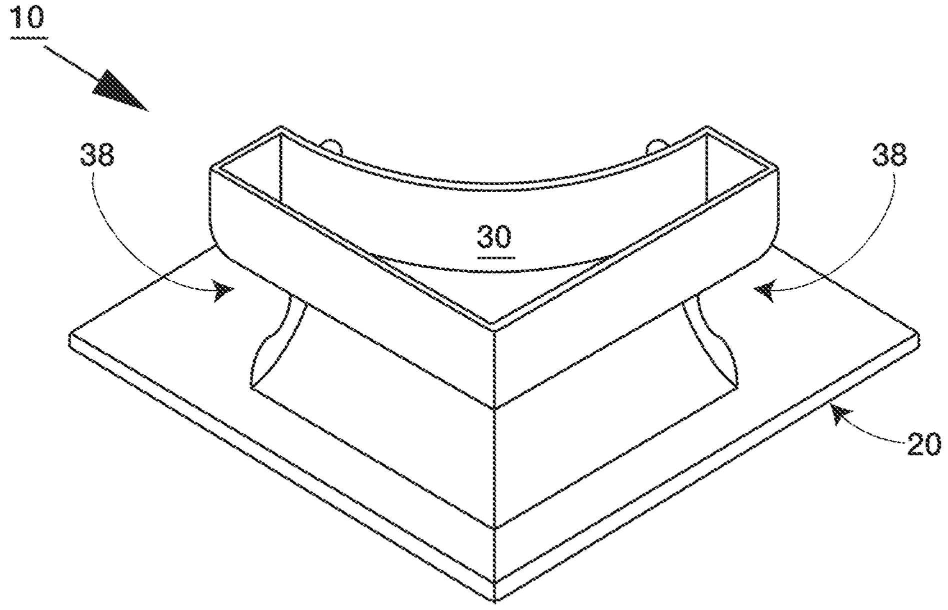
FIG. 9 depicts an isometric view of an embodiment.
Figure 10:
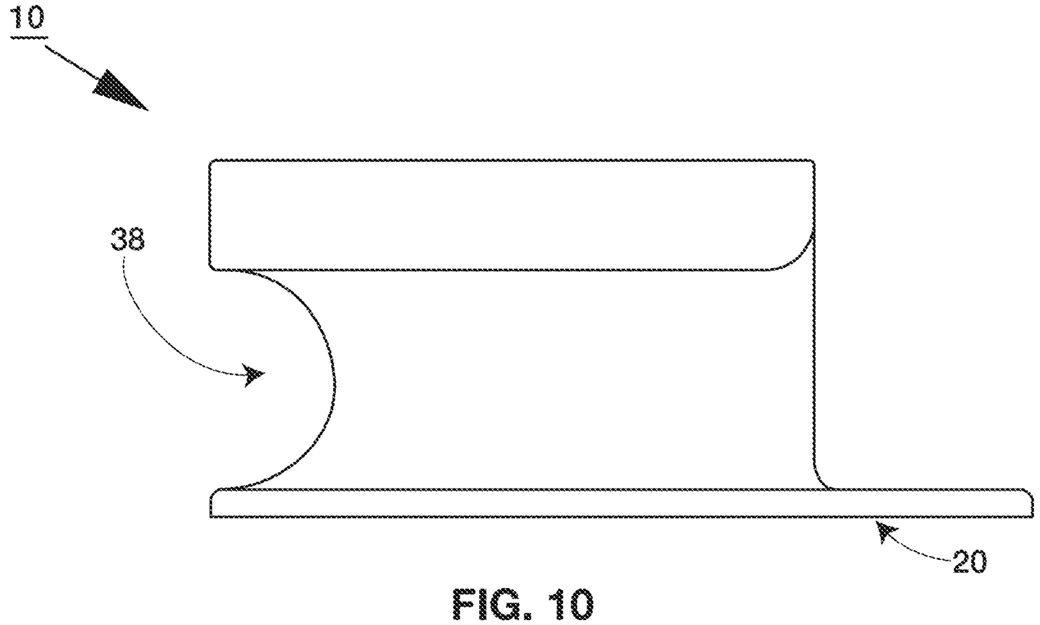
FIG. 10 depicts a side view of an embodiment.
Figure 11:
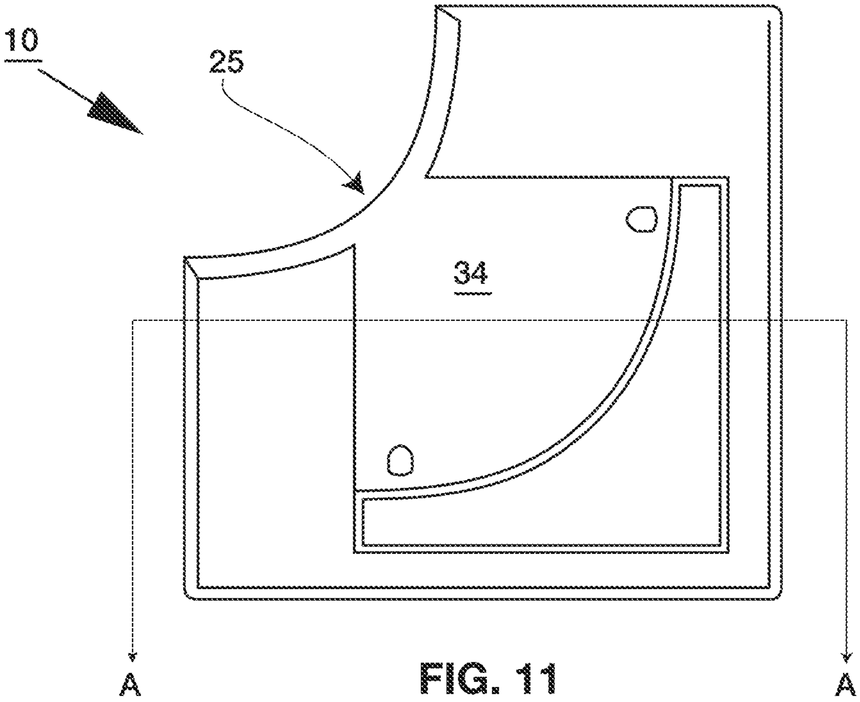
FIG. 11 depicts a top view of an embodiment.
Figure 12:
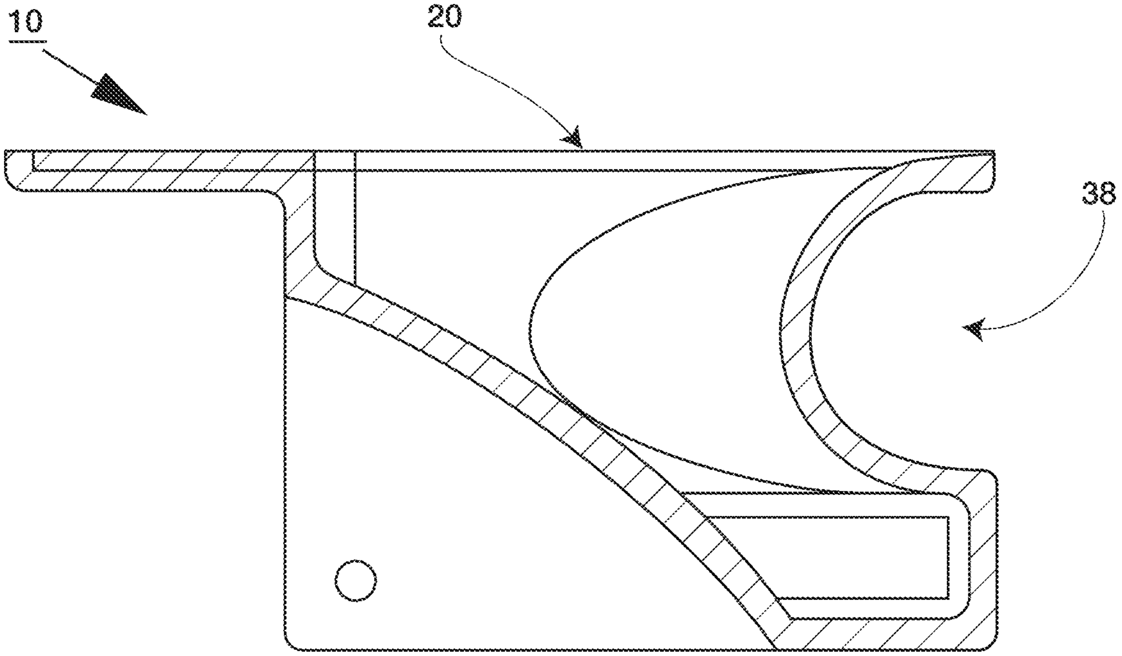
FIG. 12 depicts a cross-sectional view of an embodiment taken along Section A-A of FIG. 11.

FIG. 9 is an isometric view of device 10 illustrating channel 38 laterally traversing a region between body 30 and base 20 in an arcuate path. FIG. 10 depicts a side view of device 10. FIG. 11 depicts a top view of the device. In a preferred embodiment base 20 includes two edges of approximately 7.00"-approximately 8.00" approximately each, with approximately 7.50" each being most preferred. FIG. 12 depicts a cross-sectional view of the device taken along Section A-A of FIG. 11.

In a preferred embodiment device 10 is manufactured as a single piece having a hollow or semi-hollow center by injection molding, although other manufacturing methods including 3-D printing are also within the scope of the invention. The device can be constructed of a variety of materials including plastics, metals, ceramics, and composites thereof.

Referring back to FIG. 2, in use one would position at least one device 10 base-down adjacent a tire, preferably at outer tire shoulder 55. The device should be positioned so recess 25 and tire abutment surface 34 are in contact, or are in as close proximity as reasonably possible, to tire 50. One would then use a hose, for example a water or air hose or even an electrical cord, in the ordinary manner. When the risk of the hose becoming trapped under the tire has ceased, for example the hose is no longer in use, the device or devices can be removed from underneath the tires.

It should be understood that the foregoing relates to exemplary embodiments of the invention and that modifications may be made without departing from the spirit and scope of the invention as set forth in the following claims. By way of example, the device can be scaled for use with large heavy equipment. Terms such as "substantially" and the like shall mean within reasonable bounds when considering limitations such as machines, materials, manufacturing methods, and people. By way of example, a "substantially smooth" surface means there are no intentional bumps or irregularities. All ranges set forth herein include the endpoints as well as all increments there between, even if not specifically stated. By way of example 1 to 2 inches includes 1 inch, 1.000001 inches and so forth. Finally, unless otherwise stated or contrary to common sense, "approximate" and the like shall mean +/−10%.

What is claimed is:

1. A hose guiding system including:

a. A tire defining a shoulder;

b. A device configured to rest adjacent to and conform to a portion of said shoulder, the device including a base defining a substantially square lateral perimeter and a body positioned entirely within the lateral perimeter of the base, the device further defining a concave tire abutment surface formed by a recess defined by the body and configured to receive within the recess and thereby engage the shoulder without simultaneously engaging an opposite shoulder region of the tire; and c. A channel defined by said device, said channel sized and shaped to accommodate a longitudinal segment of the hose sliding therethrough.

2. The hose guiding system of claim 1 wherein said base defines a substantially planar bottom surface configured to rest on a ground surface adjacent the tire.

3. The hose guiding system of claim 1 wherein said recess extends along a lateral side of the device and opens toward the tire.

4. The hose guiding system of claim 3 wherein said tire abutment surface defines at least one stabilizing protrusion adjacent to said shoulder, said at least one stabilizing protrusion for maintaining said device in a position relative to said shoulder.

5. The hose guiding system of claim 4 wherein at least one stabilizing protrusion extends into the recess and is positioned to contact the shoulder of the tire when the shoulder is received within the recess.

6. The hose guiding system of claim 2 wherein said channel is substantially parallel relative to the bottom edge of said base.

7. A method for enabling a hose to move relative to a tire including the steps of:

a. Positioning a device adjacent to a shoulder of the tire, the device including a base defining a substantially square lateral perimeter and a body positioned entirely within the lateral perimeter of the base, the body defining a concave tire abutment surface formed by a recess defined in the body;

b. Aligning the concave tire abutment surface and the recess with the shoulder such that the recess receives a portion of the shoulder, at least one protrusion defined by said device is in close approximation to said shoulder, and at least one channel defined by said device is substantially horizontal and oriented outwardly away from said shoulder;

c. Introducing a segment of the hose to said channel;

d. Exerting a pulling force on said segment of hose to effectuate horizontal movement of said segment of hose; and e. Allowing said segment of hose to slide horizontally along said at least one channel while said device remains substantially stationary relative to said tire.

8. The method of claim 7 wherein said step of positioning a device adjacent to the shoulder of a tire includes the step of positioning said device on a surface selected from the group consisting of ground, flooring, cement and combinations thereof.

9. The method of claim 7 wherein said step of introducing a segment of hose to said channel includes the step of introducing the segment of hose having a diameter of approximately 1.0" to approximately 1.5".

* * * * *